Nov. 19, 1940.  H. T. NICOU  2,222,570
AMBULANCE AUTOMOBILE
Filed May 28, 1938  2 Sheets-Sheet 1
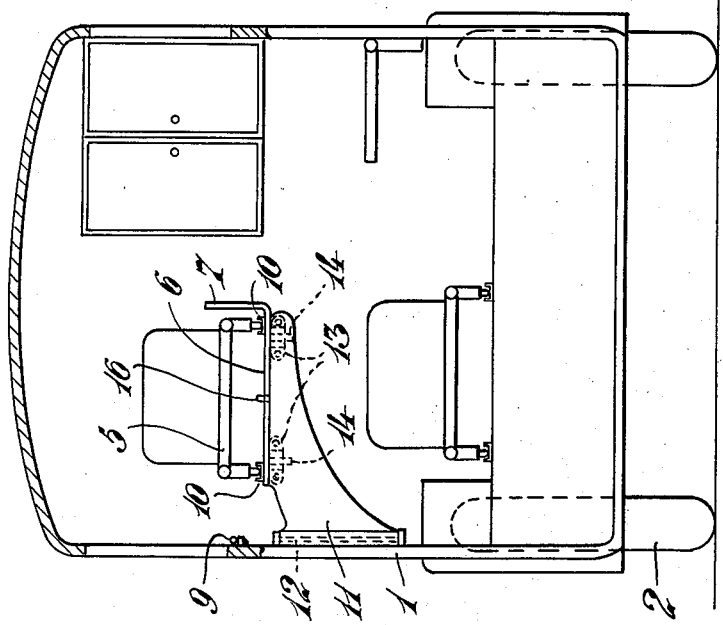
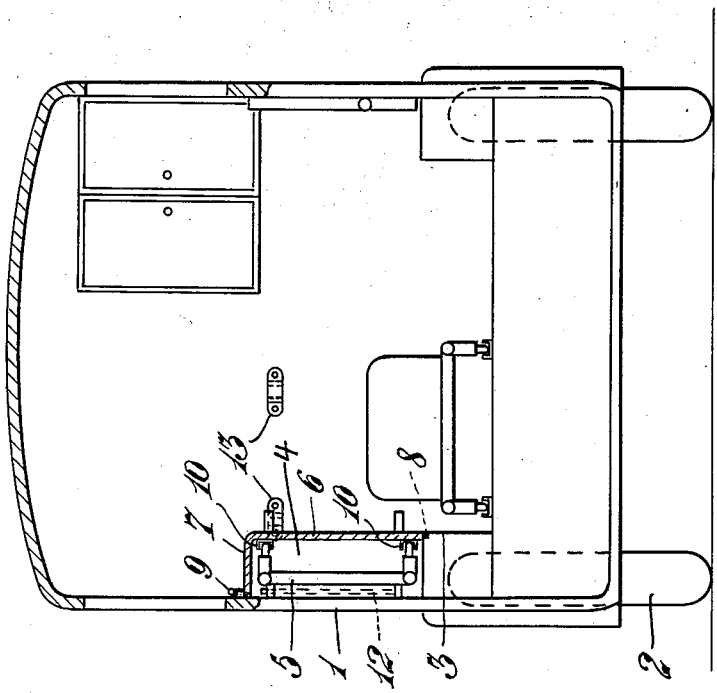
Inventor
Hans T. Nicou
By Sommers & Young attys Nov. 19, 1940.   H. T. NICOU   2,222,570
AMBULANCE AUTOMOBILE
Filed May 28, 1938   2 Sheets-Sheet 2

Inventor
Hans T. Nicou,
By Sommers & Young Attys

Patented Nov. 19, 1940

2,222,570

UNITED STATES PATENT OFFICE 2,222,570

AMBULANCE AUTOMOBILE

Hans Teodor Nicou, Sodra Angby, near Stockholm, Sweden

Application November 28, 1938, Serial No. 242,815
In Sweden July 16, 1937

1 Claim. (Cl. 296—19)

In my copending patent application Ser. No. 127,219 I have described an improvement in ambulance automobiles, whereby a reserve stretcher normally kept in a box inside the vehicle may be easily removed from said box and placed into position for receiving a patient. According to said application a wall of said box which is accessible from the interior of the vehicle is movable in such a way that it can be shifted from its box closing position to a substantially horizontal position for supporting the stretcher on an appropriate level above the floor of the vehicle. Said wall, when thus removed and shifted, renders the interior of the box freely accessible for the removal of the stretcher kept therein, said stretcher being, preferably, so arranged as to move with the wall as a whole in such a way that it will be left standing on said wall, ready for use, when the latter reaches its shifted horizontal position. In this position the wall is sustained by supporting members secured to the walls of the vehicle body. Such supporting members, however, can only be provided at the front wall and the respective side wall of the vehicle. At the rear end of the stretcher supporting wall as well as the longitudinal side thereof remote from said side wall, separate sustaining means must be used.

The present invention has for its object to provide improved means for sustaining the said movable wall of the box when used as a stretcher support. According to the invention I provide a bracket normally concealed in the box when closed which is hinged to the respective side wall of the vehicle, so that it may be swung out into a position at right angles to said side wall after removing or shifting of the movable wall of the box. The bracket after having been thus swung out, may act to support the movable wall of the wall at a point adjacent the rear end thereof. At its front end, the shifted wall of the box may be carried by appropriate fittings attached to the front wall of the vehicle.

Figure 3:
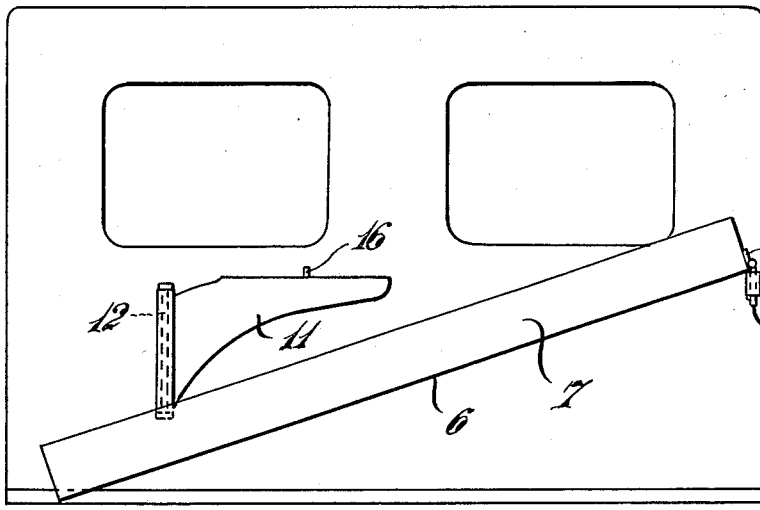
Figure 4:
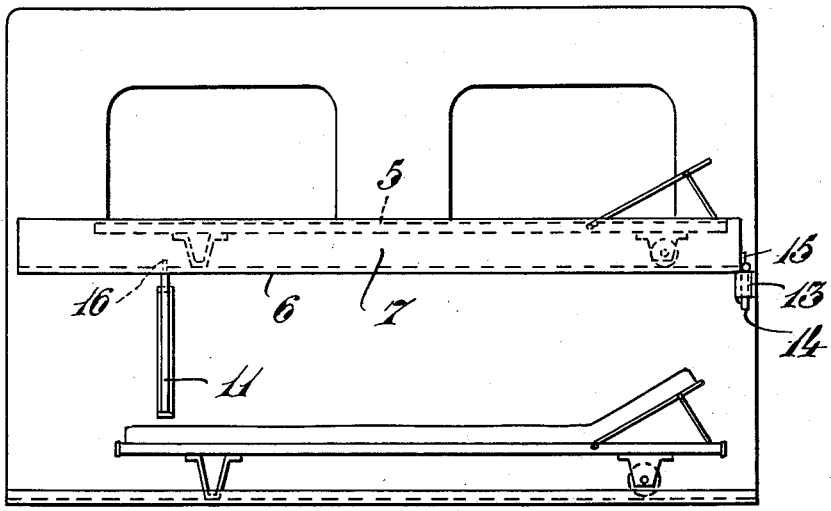

In the accompanying drawings one embodiment of the invention is illustrated. Fig. 1 is a cross section of an ambulance automobile according to the invention, the box containing an extra stretcher being shown in closed position. Fig. 2 is a cross section of the automobile with the box shown in open state and the movable wall thereof used as a stretcher support. Fig. 3 is a diagrammatic longitudinal section of the automobile with the movable wall of the box shown in position for placing a stretcher thereon. Fig. 4 is a diagrammatic longitudinal section of the automobile, showing two stretchers placed therein.

Provided along one longitudinal wall 1 inside the vehicle, above the wheel cover 3 projecting into the vehicle, which covers the wheel 2, is a box 4. Said box serves to receive a stretcher 5, usually a reserve stretcher, when not used for carrying a patient. The box is bounded outwardly by the side wall 1 of the vehicle, downwardly by the wheel cover 3, and inwardly, that is towards the interior of the vehicle, by a removable member comprising a side wall 6 and an upper wall 7 integral therewith. The member 6, 7 is held in the position shown in Fig. 1 in which it closes the box, in part, by means of pins 8 engaging apertures of the wheel cover and, in part, by means of easily removable locking members 9 by which the wall 7 is secured to the side wall 1 of the vehicle. The wall 6 carries on its inside guiding bars 10 for the wheels or legs of the stretcher 5.

Inside the box there is an arm or a bracket 11 hingedly connected to the wall 1 by a vertical hinge 12. Normally, said bracket lies close to the wall 1, parallel therewith, and when the box is closed by the member 6, 7, the bracket is concealed in the box. In this position it does not interfere in any way with the stretcher 5 kept in the box, but, on the contrary, it acts to positively maintain the stretcher in a fixed position, thereby preventing it from shaking during the motion of the car (see Fig. 1).

Provided on the front wall of the vehicle are fittings 13 adapted to carry the front end of the member 6, 7 when the latter is used as a support for a stretcher. To this end the wall 6 carries pins 14 connected thereto by horizontal hinges 15 which are adapted to engage vertical holes of the fittings 13. Owing to the hinged connection of the pins 14 to the wall 6, the member 6, 7 can be lowered down and lifted up at its rear end.

When the reserve stretcher kept in the box is to be used, the locking elements 9 are released, thereby allowing the member 6, 7 to be removed. The member 6, 7 is then placed with the wall 6 down, and the two pins 14 at the front end of it are inserted into the holes of the fittings 13. The rear end of the member 6, 7 is then lowered until it comes into contact with the floor of the vehicle, as shown in Fig. 3. In this position of the member 6, 7 the stretcher with the patient resting thereon may be easily placed on the wall 6 and pushed inwards. After the reserve stretcher has been pushed in on the sloping wall 6 and attached by appropriate locking members thereto, the rear end of the member 6, 7 is lifted so as to bring the member 6 into a position above the level of the bracket 11. The bracket is then swung out from the wall 1, and the member 6, 7 with the stretcher resting thereon is laid down on the wall 6 and secured thereto as, for instance, by means of a locking pin 16 upstanding from the bracket and engaging an aperture formed in the wall 6.

As will appear from Fig. 2, there is ample space at the right hand side of the vehicle to allow one or more persons to sit on a seat 17.

If under special circumstances, as for instance in case of war, it is desirable to carry as many lying patients as possible, also the right hand side of the vehicle may be arranged and equipped in the same way as above described in connection with the left hand side, thereby allowing four stretchers to be placed in the vehicle and to be easily inserted therein and removed therefrom.

What I claim is:

In an ambulance automobile, a body having walls forming a housing, angularly disposed walls forming with walls of the housing, a longitudinally extending box inside said housing along a side wall thereof for containing a stretcher, a bracket hingedly connected to said side wall inside said box, the box having a completely removable wall, by the removal of which the interior of the box is exposed to the interior of the housing and the bracket is allowed to swing out from the side wall to which it is connected into the interior of the housing for carrying the rear end of the removed wall in order to allow said removable wall to act as a support for a stretcher, and hinge means for having a substantially horizontal axis for connecting the fore end of the removed wall to the front wall of the housing so that when so connected the rear end of said wall may rest on the floor of the vehicle without danger of sliding rearwardly and falling from its fore end connection means, while the rear end may be swung upwardly into a position in which its rear end rests on the swung out bracket on a level with the front end of the removed wall thus connected to the front wall of the housing.

HANS TEODOR NICOU.